United States Patent [19]

Beckert et al.

[11] 4,231,891

[45] Nov. 4, 1980

[54] SOLID COMPOSITIONS FOR GENERATION OF GASES CONTAINING A HIGH PERCENTAGE OF HYDROGEN OR ITS ISOTOPES

[75] Inventors: Werner F. Beckert, Las Vegas, Nev.; William H. Barber, Brandywine, Md.; Ottmar H. Dengel, Front Royal, Va.

[73] Assignee: The United States of America as represented by the Secretary of the Navy, Washington, D.C.

[21] Appl. No.: 916,423

[22] Filed: Jun. 16, 1978

[51] Int. Cl.$^3$ ................................................ C01B 1/07
[52] U.S. Cl. ..................................... 252/188; 149/87; 252/188.3 R; 423/648 R
[58] Field of Search ..................... 252/188, 188.3 R; 423/248, 648 R; 149/87

[56] References Cited

U.S. PATENT DOCUMENTS

| | | | |
|---|---|---|---|
| 3,734,863 | 5/1973 | Beckert et al. | 252/188 |
| 3,862,052 | 1/1975 | Beckert et al. | 252/188 |
| 3,931,395 | 1/1976 | Beckert et al. | 423/648 R |
| 3,948,699 | 4/1976 | Ayers et al. | 423/648 R |
| 3,948,700 | 4/1976 | Ayers et al. | 423/648 R |
| 3,977,990 | 8/1976 | Beckert et al. | 252/188 |
| 4,005,185 | 1/1977 | Ishizaka | 423/648 R |
| 4,022,705 | 5/1977 | Beckert et al | 252/188.3 R |
| 4,064,226 | 12/1977 | Beckert et al. | 423/648 R |

*Primary Examiner*—Benjamin R. Padgett
*Assistant Examiner*—Irwin Gluck
*Attorney, Agent, or Firm*—Sciascia R. S.; A. L. Branning; H. B. Field

[57] ABSTRACT

Solid compositions which, when heated to initiate the reaction between the components of the compositions, generate gases containing a high percentage of hydrogen or hydrogen isotopes. The compositions comprise intricate mixtures of certain metal powders and certain ammonium or hydrazinium salts.

12 Claims, No Drawings

SOLID COMPOSITIONS FOR GENERATION OF GASES CONTAINING A HIGH PERCENTAGE OF HYDROGEN OR ITS ISOTOPES

BACKGROUND OF THE INVENTION

This invention relates generally to the art of gas generation and more particularly to compositions and methods for generating hydrogen gas.

There are currently only a limited number of methods available to produce hydrogen on a small scale. For example, hydrogen gas is generated by the reaction of metals or metal hydrides with acids, bases, water, alcohols, etc. Hydrogen gas can also be stored in and released from pressurized gas cylinders. However, these methods are not applicable when severe weight and/or volume restrictions are imposed on a system which must generate relatively small amounts of hydrogen gas (up to about 250 liters) in a short time (less than one minute). The following example will illustrate this point: The exothermic reaction of $LiH+H_2O \rightarrow LiOH+H_2$ with 27 kcal/mole hydrogen. Assuming 100 percent completion of the reaction without an available external heat sink, then well over 300 grams of water would be needed to produce 1 mole of hydrogen gas (i.e., 18 grams of water as reactant and the remainder for a heat sink) in order to prevent boiling of the water and the formation of a hydrogen/steam mixture. This means that the weight/volume ratio (reactants (grams) per liter of hydrogen generated) is greater than 14 grams per liter.

Another reaction which has been proposed to generate hydrogen is based on the thermal decomposition of hydrazine bisborane. This reaction is represented by the following equation:

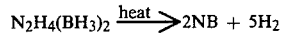

$$N_2H_4(BH_3)_2 \xrightarrow{heat} 2NB + 5H_2$$

Although in theory this reaction is very favorable in terms of hydrogen produced per gram of reactant (weight-volume ratio is 0.54 gram per liter assuming 100 percent yield), the temperature required to keep the reaction going is high enough to melt glass fiber cloth and the hydrogen produced is at its ignition temperature. In addition, hydrazine bisborane is not commercially available and it is difficult to handle because of its instability.

U.S. Pat. Nos. 3,734,863, 3,862,052, 3,931,395, 3,977,990, and 4,022,705 to Beckert et al., which are incorporated herein by reference, teach various hydrogen generating compositions and their methods of preparation. More specifically, U.S. Pat. Nos. 3,734,863, 3,862,052, and 3,931,395 disclose reacting ammonium or hydrazinium salts with suitable complex metal hydrides as expressed by the following general formulas and general equations:

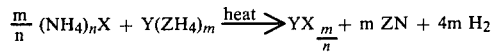

$$\frac{m}{n}(NH_4)_nX + Y(ZH_4)_m \xrightarrow{heat} YX_{\frac{m}{n}} + m\ ZN + 4m\ H_2$$

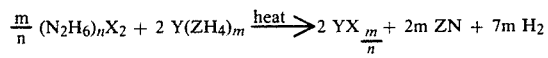

$$\frac{m}{n}(N_2H_6)_nX_2 + 2\ Y(ZH_4)_m \xrightarrow{heat} 2\ YX_{\frac{m}{n}} + 2m\ ZN + 7m\ H_2$$

where x is an acid group such as an inorganic acid group like halogen (Cl,Br,F), sulfate (SO$_4$), and the like, n is the valency of the acid group, Y is a mono- or divalent metal capable of forming complex hydrides, such as alkali and alkaline earth metals like Li, Na, K, Mg, Ba, Ca, etc., m is the valency of said metal and Z is a trivalent metal capable of forming complex hydrides, such as B, Al, and the like. Similarly, U.S. Pat. No. 3,977,990 to Beckert et al. teaches that the hydrogen gas evolution rates and the gas temperatures of certain hydrogen gas generating compositions are modified by adding compounds such as LiAlH$_4$ which thermally decompose in the reaction zone producing hydrogen while lowering the reaction temperature; and certain acetonates, certain metal oxides, and the like which, when added in relatively small amounts accelerate the hydrogen gas evolution rate.

While these methods and compositions are satisfactory in providing hydrogen at a fast rate from solid, storable compositions, complex metal hydrides are commercially available only to a limited extent, and they are relatively expensive. Especially for large-scale uses such as in laser or fuel cell applications it is highly desirable to use compositions that are less costly.

SUMMARY OF THE INVENTION

Accordingly, there is provided by the present invention solid compositions for generating gases containing a high percentage of hydrogen or hydrogen isotopes, comprising an intimate mixture of at least one metal powder selected from the group consisting of magnesium, aluminum, vanadium, zirconium, and titanium and at least one salt selected from the group consisting of (NH$_4$)X and (N$_2$H$_6$)$_n$X wherein H stands for hydrogen and its isotopes, X is an inorganic acid group and n is the valency of said inorganic acid group and wherein said compounds are present in about stoichiometric amounts or are present in amounts such that there is a stoichiometric excess of one of the components.

OBJECTS OF THE INVENTION

Therefore, one object of the present invention is to provide a low cost source of gaseous hydrogen, hydrogen isotopes, or mixtures thereof.

Another object of this invention to provide novel compositions and methods for generating gaseous hydrogen isotopes or mixtures thereof.

Still another object of this invention is to provide compositions and methods for generating gaseous hydrogen isotopes or mixtures thereof which are particularly applicable where small amounts of gas are required in a very short time.

A further object of this invention is to provide methods for generating gaseous hydrogen isotopes or mixtures thereof in which the ratio of weight of reactants to volume of gas generated is smaller than heretofore attained.

Yet another object of this invention is to provide a method for generating gaseous hydrogen isotopes or mixtures thereof which is economical and relatively safe.

Still another object of this invention is to provide compositions and methods for generating gaseous hydrogen, hydrogen isotopes, or mixtures thereof suitable for use in laser applications, fuel cells, nuclear reactions, chemical reactions.

A further object of the present invention is to provide additional compositions and methods for generating hydrogen, hydrogen isotopes, or mixtures thereof for use in flueric devices and mechanical power sources.

Other objects and many of the attendant advantages of this invention will be readily appreciated as the same becomes better understood by reference to the following detailed description of the preferred embodiments.

DESCRIPTION OF THE PREFERRED EMBODIMENTS

The method of this invention is based on a solid state reaction between two or more suitable components. Particularly, the component ingredients employed in the mixtures and methods of the present invention and the reactions by which the desired gaseous hydrogen isotopes of deuterium and tritium or isotopes mixtures generated are expressed by the following general formulas and general equations:

$$m(NH_4)_NX + 4nY \rightarrow Y_nX_m + nY_3N_m + 2mnH_2 \quad (I)$$

$$m(N_2H_6)_nX_2 + 8nY \rightarrow 2Y_nX_M + 2Y_{3n}N_{mn} + 3mnH_2 \quad (II)$$

where H stands for hydrogen and its isotopes, X is an acid group such as an inorganic acid group like halogen (Cl, Br, F, etc.), sulfate ($SO_4$) and the like, n is the valency of the acid group Y is a metal power such as magnesium, aluminum, vanadium, zirconium and titanium and m is the valency of the metal under the reaction conditions. The compounds employed in the mixture of this invention are either commercially available or may be prepared by conventional means. The compositions tested have been found to be stable at ambient temperature and to react at higher temperatures ranging from about 160° C. to about 400° C., producing gases of varying compositions. For example, the composition consisting of Mg and $NH_4Cl$ in stoichiometric amounts starts to react at approximately 200° C. producing a gas mixture consisting of approximately 85% $H_2$ and 15% $N_2$. The gas temperature is approximately 350° C.

The gas generating reactions of this invention are initiated by locally heating the mixture of the component reactants to reaction temperature. This can be accomplished by any suitable heat source such as a resistance heater fabricated from Nichrome wire, a pyrofuse, and electrical squib, a mechanical squib, or the like. In addition, ordinary percussion caps and igniter pills such as $BaCrO_4/Zr$ may be utilized if desired.

A temperature of at least about 160° C. is generally required to initiate the reaction. The component ingredients are generally intimately mixed in stoichiometric amounts according to the aforeidentified general equations. However, it may be desirable to employ an excess of one of the components. For example, one reason why one would want an excess of one of the components is to more efficiently utilize the more expensive components. Furthermore, the use of mixtures of three or more components is also within the scope of the present invention. For example a mixture of $NH_4F + NH_4Cl + Mg + Al$ or
$N_2H_6Cl_2 + NH_4F + Mg + Al$ may be employed as gas generating compositions in the method of the present invention.

These hydrogen generating compositions may be encapsulated or otherwise packaged in such a manner that they may be adapted as a convenient source of predetermined quantities of hydrogen for the inflation of lighter-than-air balloons or other inflatables, flueric devices, mechanical power sources, etc., as well as other military and commercial uses. These compositions may be utilized as powders or they may be pressed into pellets to facilitate handling and improve storage stability and safety characteristics, as well as to achieve a more uniform rate of gas evolution after initiation. Coating of one or all of the starting components with a small amount (usually about 0.5 to 5 weight percent) of a suitable polymer prior to mixing has been found to further improve the handling and storage characteristics. Examples of such suitable polymers are polystyrene, polyethylene, polybutadiene, hydroxyvinyl resins, and polycarbonates. Such coating is especially beneficial for components which are sensitive to moisture.

It is also part of the instant invention to optionally use binders or plasticizers to improve handling and or mechanic stability. Any binder compatible with the rest of the composition may be used, such as polystyrene, styrene-isobutylene copolymers, or others. Up to about 15 percent by weight of said composition is appropriate. Similarly, any plasticizer may be used so long as it is compatible with the rest of the composition. The preferred amount of plasticizer is up to about 30 weight percent of said binder. In addition, any solvent which dissolves the binder and is compatible with the rest of the composition can be used to facilitate processing of the composition. Special precautions might be necessary in the selection of binders, plasticizers, additives and solvents when high-purity gases are desired. For example, when pure deuterium gas is desired it is beneficial to either use deuterated binders, plasticizers, additives and solvents or to use binders, plasticizers, additives and solvents which do not contain any hydrogen exchangeable under the conditions of use such as polyfluorinated compounds.

Small particle sizes (100) of the ingredients are desirable as large particle sizes generally decrease rate and yield. Although, in general, a small particle size of the gas generator ingredients is therefore desirable to obtain a fast and nearly complete reaction, large particle sizes might be useful for special purposes, e.g. to slow down the reaction, or to obtain a specific grain structure.

The material is conveniently prepared as a slurry of the components in an inert solvent such as toluene which contains the dissolved binder and plasticizer. After evaporation of the solvent in vacuo, the material is ground in a blender and then pressed to form slugs. Depending on the nature of the material and the intended application other mixing and shaping techniques can be used, such as casting, extrusion, or inert diluent mixing.

After generation, the gases can be cooled by heat exchangers and/or heat sink arrangements containing materials having a high specific heat such as copper, nickel, or cobalt, or materials which exhibit an endothermic phase change between ambient and the desired temperature, such as low-melting materials which preferable have high heats of fusion and heat capacities (Wood's metal, Rose's metal, or chemical compounds such as $Na_2HPO_4 2H_2O$) or low-boiling liquids.

Additives which decompose during the reaction under gas evolution can be added directly to the basic mixture, or they can be physically separated from the basic mixture (e.g. confined in tubes embedded in the basic mixture, or by microencapsulation). This separation might be desirable in case of limited compatibility of the additives with the basic mixture.

The general nature of the invention having been set forth, the following examples are presented as specific illustrations thereof and also so that the invention be better understood. Furthermore, it will be understood that the invention is not limited to these examples but is susceptible to various modifications that will be recognized by one of ordinary skill in the art.

EXAMPLE I

Anhydrous ammonium chloride is mixed with magnesium powder (10% excess over stoichiometric amount) in a toluene solution of isobutyl-styrene copolymer and conco oil as plasticizer, the solvent is evaporated in vacuo at ambient temperature, the resulting dry mass pulverized and pressed into the desired shape. When fired in a suitable light weight aluminium gas generator case such as described in U.S. Pat. No. 3,898,048 to Barber et al included herein by reference a gas consisting to approximately 85% of hydrogen is produced at a rapid rate and a temperature of approximately 350° C. The gas yield is about 0.5 l/g of mixture.

EXAMPLE II

The process is repeated with ammonium bromide and aluminium powder as the main ingredients. The gas yield is approximately 0.3 l/g of mixture.

As will be evident to those skilled in the art, various modifications can be made in light of the foregoing disclosure without departing from the scope and spirit thereof.

What is claimed and desired to be secured by Letters Patents of the United States is:

1. Solid compositions for generating gases containing a high percentage of hydrogen or hydrogen isotopes comprising an intimate mixture of at least one metal powder selected from the group consisting of magnesium, aluminum, vanadium, zirconium, and titanium and at least one salt selected from the group consisting of an ammonium salt of the formula $(NH_4)_nX$ and a hydrazinium salt of the formula $(N_2H_6)_nX$ wherein H stands for hydrogen and its isotopes, X is an inorganic acid group and n is the valency of said inorganic acid group and wherein said compounds are present in about stoichiometric amounts or are present in amounts such that there is a stoichiometric excess of one of the components.

2. A composition according to claim 1 wherein said compounds are present in stoichiometric amounts.

3. A composition according to claim 1 wherein said compounds are present in amounts such that there is a stoichiometric excess of one of the components.

4. A composition of claim 1 wherein said acid group is selected from the group consisting of halogen and sulfate.

5. A composition of claim 4 wherein said halogen is selected from the group consisting of Br, F, and Cl.

6. A composition of claim 5 wherein said halogen is chlorine and said metal is magnesium.

7. A composition of claim 4 wherein said salt is an ammonium, salt.

8. A composition of claim 4 wherein said salt is a hydrazinium salt.

9. The composition of claim 1 wherein at least one component of the mixture is coated with a polymer selected from the group consisting of polystyrene, polyethylene, polybutadiene, polycarbonate and hydroxyvinyl resins.

10. The composition of claim 1 further comprising a binder up to about 15% by weight of said compositions.

11. The composition of claim 10 additionally comprising a suitable plasticizer up to about 30% by weight of said binder.

12. The composition of claim 10 wherein said binder comprises an isobutyl-styrene copolymer.

* * * * *